US009156208B2

(12) United States Patent
Heim et al.

(10) Patent No.: US 9,156,208 B2
(45) Date of Patent: Oct. 13, 2015

(54) INFUSION METHOD AND FLOW AID

(75) Inventors: Clemens Heim, Stade (DE); Paulin Fideu, Stade (DE); Hauke Seegel, Nahrendorf (DE); Axel Herrmann, Stade (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 410 days.

(21) Appl. No.: 13/519,935

(22) PCT Filed: Dec. 29, 2010

(86) PCT No.: PCT/EP2010/070829
§ 371 (c)(1),
(2), (4) Date: Nov. 5, 2012

(87) PCT Pub. No.: WO2011/080288
PCT Pub. Date: Jul. 7, 2011

(65) Prior Publication Data
US 2013/0099426 A1  Apr. 25, 2013

Related U.S. Application Data

(60) Provisional application No. 61/290,514, filed on Dec. 29, 2009.

(30) Foreign Application Priority Data

Dec. 29, 2009  (DE) .......................... 10 2009 060 699

(51) Int. Cl.
*B29C 70/44* (2006.01)
*B29C 70/54* (2006.01)
*B29C 70/02* (2006.01)

(52) U.S. Cl.
CPC ............. *B29C 70/028* (2013.01); *B29C 70/443* (2013.01); *B29C 70/546* (2013.01)

(58) Field of Classification Search
CPC .... B29C 70/44; B29C 43/12; B29C 43/3642; B29C 70/443; B29C 44/183; B29C 44/185; B29C 2033/0005; B29C 2043/4657; B29C 2043/3668; B29C 33/485; B29C 2043/3644; B29C 70/028; B29C 70/546
See application file for complete search history.

(56) References Cited

U.S. PATENT DOCUMENTS 2,913,036 A * 11/1959 Smith ........................... 264/102
3,137,750 A *  6/1964 Gringras ....................... 264/257
(Continued)

FOREIGN PATENT DOCUMENTS

EP   1 484 165 A2   12/2004
EP   1484165    *   12/2004
(Continued)

OTHER PUBLICATIONS

International Preliminary Report on Patentability issued on Jul. 19, 2012 in corresponding application No. PCT/EP2010/070829.
(Continued)

*Primary Examiner* — Matthew Daniels
(74) *Attorney, Agent, or Firm* — Carter, DeLuca, Farrell & Schmidt, LLP

(57) ABSTRACT

Disclosed is an infusion method for the manufacture of a fiber-reinforced composite component with a flow promoter, wherein the flow velocity of the matrix material in a component to be infiltrated is modified by means of the flow promoter. Also disclosed is a flow promoter, which has an integral body section for the modification of the flow velocity.

7 Claims, 2 Drawing Sheets

(56) References Cited

U.S. PATENT DOCUMENTS

| | | | | |
|---|---|---|---|---|
| 4,873,044 | A * | 10/1989 | Epel | 264/257 |
| 4,902,215 | A * | 2/1990 | Seemann, III | 425/406 |
| 4,963,215 | A * | 10/1990 | Ayers | 156/286 |
| 5,104,718 | A * | 4/1992 | Asada et al. | 428/167 |
| 5,242,651 | A * | 9/1993 | Brayden et al. | 264/510 |
| 5,490,602 | A * | 2/1996 | Wilson et al. | 216/56 |
| 5,721,034 | A * | 2/1998 | Seemann et al. | 428/71 |
| 5,971,742 | A * | 10/1999 | McCollum et al. | 425/542 |
| 6,506,325 | B1 * | 1/2003 | Cartwright | 264/40.6 |
| 6,818,159 | B2 * | 11/2004 | Hinz | 264/40.6 |
| 6,919,039 | B2 * | 7/2005 | Lang et al. | 264/510 |
| 7,060,156 | B2 * | 6/2006 | Mack et al. | 156/285 |
| 7,147,448 | B2 * | 12/2006 | Slaughter et al. | 425/129.1 |
| 7,192,634 | B2 * | 3/2007 | Carter et al. | 428/113 |
| 2003/0211194 | A1 | 11/2003 | Louderback et al. | |
| 2003/0227107 | A1 | 12/2003 | Stewart | |
| 2004/0053028 | A1 * | 3/2004 | Wagener et al. | 428/292.1 |
| 2004/0140587 | A1 * | 7/2004 | Hadley | 264/257 |
| 2004/0157519 | A1 * | 8/2004 | Goodell et al. | 442/181 |
| 2005/0073076 | A1 * | 4/2005 | Woods et al. | 264/511 |
| 2005/0257887 | A1 * | 11/2005 | Tsotsis | 156/308.2 |
| 2006/0252334 | A1 * | 11/2006 | LoFaro et al. | 442/400 |
| 2008/0295950 | A1 * | 12/2008 | Mack et al. | 156/145 |
| 2013/0207321 | A1 * | 8/2013 | Grove-Nielsen | 264/571 |
| 2014/0147688 | A1 * | 5/2014 | Corral et al. | 428/519 |

FOREIGN PATENT DOCUMENTS

| | | |
|---|---|---|
| EP | 2149441 A1 | 2/2010 |
| WO | 2007/040797 A2 | 4/2007 |
| WO | WO 2007040797 * | 4/2007 |
| WO | 2008114809 A1 | 9/2008 |

OTHER PUBLICATIONS

International Search Report for Appln. No. PCT/EP2010/070829 mailed May 11, 2011.

German office action from corresponding German application 102009060699 dated Jun. 25, 2010.

* cited by examiner

INFUSION METHOD AND FLOW AID

TECHNICAL FIELD

The invention concerns an infusion method for the manufacture of a fibre-reinforced composite.

BACKGROUND OF RELATED ART

A basic set-up for such infusion, or vacuum infusion, methods is shown in FIGS. 1 to 3. A component 2 composed of a base laminate 4 and an ancillary laminate 6, which is to be infiltrated with a resin, is placed on a tool 8 and covered by a flow promoter 10. The laminates 4, 6 consist of dry fibre-reinforced semi-finished products and are embodied as non-crimp fabrics (mats), knitted fabrics, woven fabrics, or similar. The flow promoter 10 serves to provide an even distribution of the resin in the directions of the length and width of the component 2 and is, for example, a knit or a mesh of, for example, polyester or polyamide. The component 2 and the flow promoter 18 are packaged in a vacuum bag (not shown), which is supported in a sealed manner on the tool 8 and which is evacuated via a suction device (not shown) close to the tool. The resin is fed via a sprue (not shown) of the flow promoter that is remote from the tool. In accordance with the resin flow direction indicated by the arrow the sprue is arranged in a left-hand region of the component, and the suction device in a right-hand region of the component.

With the feed of the resin a flow front 12 is formed, which impregnates the base laminate 4 in the thickness direction from left to right, wherein the resin in the vicinity of the flow promoter 10 runs ahead of the resin in the vicinity of the tool 8 somewhat, so that the flow front 12 is formed in the thickness direction at an inclined angle. In the vicinity of the ancillary laminate 6 a component, i.e. laminate, thickness modification is present, which, as shown in FIG. 2, leads to the fact that the resin is no longer stably distributed across the whole cross-section of the component 2, but is more severely retarded in the base laminate 4 remote from the flow promoter than in the ancillary laminate 6 close to the flow promoter, so that a kink 14 is formed, so to speak, in the flow front 12. As a result the risk exists that after the impregnation of the ancillary laminate 6 a porous area 16 may form in the base laminate 4 underneath the flow front 12, as shown in FIG. 3, which would significantly reduce the quality of the fibre composite component 2 to be manufactured.

In addition to the use of separate flow promoters, which are placed on the semi-finished product, i.e. on the component, it is likewise of known art from the applicant's application in DE 10 2007 013 987 A1 to integrate the flow promoter into the tool surface. However, even with this solution an even, stable distribution of the resin that is independent of the cross-section, i.e. the thickness, of the semi-finished product, cannot be reliably guaranteed.

SUMMARY

The object of the present invention is to create an infusion method and a flow promoter for the manufacture of a fibre-reinforced composite component that avoids the disadvantages cited above and enables an even and stable impregnation of the component fibres in the thickness direction.

This object is achieved by means of an infusion method with the features of claim 1.

In an inventive infusion method for the manufacture of a fibre-reinforced composite component a flow promoter for the distribution of a matrix material is placed on the composite component to be infiltrated. In accordance with the invention the flow velocity of the matrix material within the flow promoter is modified in at least some sections, so that the whole infusion process is stabilised and the risk of porous inclusions is minimised or eliminated. The propagation of the flow front can be specifically adjusted so that the above-described formation of a kink within the flow front can be controlled.

In one preferred example of embodiment the flow velocity in the region of a thick-walled component section is slowed down. By this means it is possible to achieve an even resin distribution across the whole thickness of the component, since the matrix material is guided across the component surface with at least a reduced velocity. Similarly in the case of complex component structures or sections the flow velocity can at least be slowed down so as to achieve a complete and stable impregnation of these component sections. In another example of embodiment the flow velocity of the matrix material within the flow promoter is increased in some sections, so that, for example, the matrix material is guided faster across thin-walled component sections, since these can be more quickly impregnated in the thickness direction.

In transitions from thick-walled to thin-walled component sections the flow velocity is preferably at least slowed down in the rear region of the thick-walled component region, i.e. near the transition, so that an even impregnation of the whole component section with the matrix material can be ensured.

In particular it is advantageous if the matrix material is temporarily halted in the flow promoter. By this means it is achieved that impregnation only in the thickness direction is possible for a certain period of time, and that the matrix material is only guided further across the component when the latter has been impregnated in the thickness direction to a particular extent. Here the set-up of the infusion method can be simplified if the flow promoter has a body section that serves as a kind of barrier for the matrix material and after a certain time is automatically dissolved by the matrix material.

In another form of embodiment the body section is dissolved by irradiation with an external energy source. Examples are electromagnetic radiation such as UV-radiation, IR-radiation, and thermal radiation. That is to say, the body section is resistant to the matrix material. This variant has the advantage that the dissolution of the body section does not have to be predetermined and thus the profile of the flow front can be specifically influenced in the course of the process in accordance with the set-up. Similarly by means of targeted irradiation only individual regions of the body section can be individually controlled. In this respect this example of embodiment allows for a certain tolerance in the design and positioning of the body section.

A further example of embodiment provides for the fact that the dissolution of the body section is initiated by irradiation with an external energy source and is then continued by the matrix material. By this means the start of the dissolution can be specifically determined and the dissolution per se can then proceed automatically.

An inventive flow promoter for an infusion method has at least one body section for purposes of modifying the flow velocity of the matrix material within the flow promoter. The advantage of such a flow promoter consists in particular in the simple manipulation and positioning, and in the stabilisation of the whole process by minimisation of the risk of pore inclusions, independently of whichever infusion method is selected. A manual labour-intensive piecing together of the flow promoter and corresponding draping is avoided, so that complex components in particular can be manufactured more simply and more cost-effectively.

In one preferred example of embodiment the body section is designed as a barrier that temporarily halts the matrix material. This temporary stop function can be achieved in that after a certain time the body section is dissolved, for example, by the matrix material.

In one variant the body section is formed from threads, which are manufactured, for example, from a plastic of the polyether sulphone group (PES).

Other advantageous examples of embodiment of the present invention are the subject of further dependent claims.

BRIEF DESCRIPTION OF THE DRAWINGS

In what follows preferred examples of embodiment of the invention are elucidated in more detail with the aid of schematic representations. Here.

DETAILED DESCRIPTION

Figure 4:
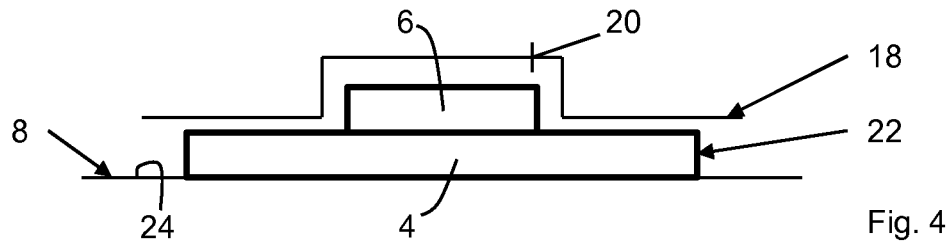
FIGS. 4 to 8 show a set-up and steps in the method for an inventive infusion process.

In a preferred infusion process in accordance with FIG. 4, a flow promoter 18 is used that has an integral body section 20, which serves as a temporary barrier for a matrix material, e.g. a resin, flowing through the flow promoter 18. The base material of the flow promoter 18 is, for example, a polyester knitted fabric. In contrast, the body section 20 is formed from integral threads of, for example polyether sulphone (PES). These have the property that after a determinable and adjustable time they are dissolved by the adjacent resin, for example, an epoxy resin or a polyester resin of the RTM 6 class (see FIG. 8), so that the resin can propagate further within the flow promoter 18 unhindered. The time after which the body section 20 dissolves is accurately determined in advance. In particular, this can be influenced by the number, thickness, and arrangement or alignment of the threads, materials and resin temperature.

In what follows an infusion method using the inventive flow promoter 18 is elucidated: Here, however, reference is only made to the significant features, and aspects of general known art concerning the set-up of an infusion method are not elucidated in any further detail. Thus, for example, peel plies, vacuum bags, positioning of the sprue and/or suction device, and ventilation weaves, are not shown, and some are even not further mentioned. This, however, does not mean that the inventive flow promoter 18 can only be deployed in the set-up here described. The aspects or features of a set-up for an infusion method that are not further mentioned are, however, items that are obvious. Similarly it is an obvious matter to arrange the inventive flow promoter 18 not only above a component 22 to be impregnated with the resin, but also underneath, i.e. between the component 22 and a tool surface 24 receiving the component 22. Examples of infusion techniques include resin transfer moulding (RTM), vacuum assisted process (VAP), vacuum resin infusion (VARI) and similar.

At the start of the infusion method, a component 22 to be impregnated with the resin is positioned on a tool surface 24, as shown in FIG. 4. It has, for example, as a base laminate 4 at least one semi-finished textile product composed of dry fibres, and as an ancillary laminate 6 at least one second semi-finished textile product composed of dry fibres, which is placed centrally on the base laminate 4. The laminates 4, 6, i.e. the semi-finished products, consist, for example, of carbon fibres or glass fibres, which are oriented to form a mat, a knitted fabric, a woven fabric, or similar.

After the positioning of the component 22 on the tool surface 24 the inventive flow promoter 18 is placed on the former so that the component 22 is arranged between the tool surface 24 and the flow promoter 18.

Figure 5:
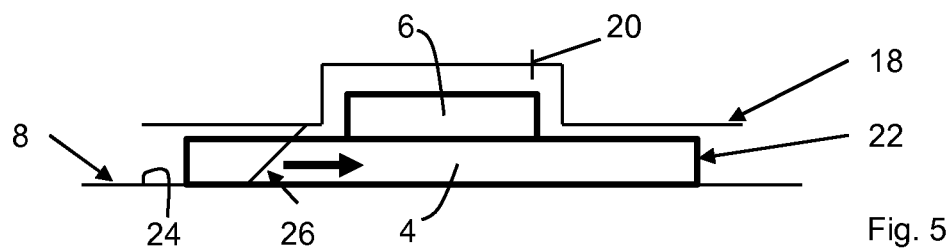

The above-described arrangement is then packaged in a vacuum bag and evacuated, wherein, according to the arrow shown in FIG. 5 and indicating the flow direction of the resin, the introduction of the resin takes place in a left-hand region of the component, and removal by suction takes place in a right-hand region of the component. The resin is then fed to the component 22 via the flow promoter 18, wherein the component 22 is impregnated by the resin in the thickness direction and a flow front 26 propagates, which, in accordance with the flow direction of the resin in the flow promoter 18, extends from left to right, here, that is to say, in the transverse direction, through the component 22. By virtue of the resin feed via the flow promoter 18 the resin in the region of the tool surface 24 is slightly held back relative to the resin in the region of the flow promoter 18, so that the flow front 26 does not form parallel to the vertical axis of the component 22 but is oriented at a slight angle.

Figure 6:
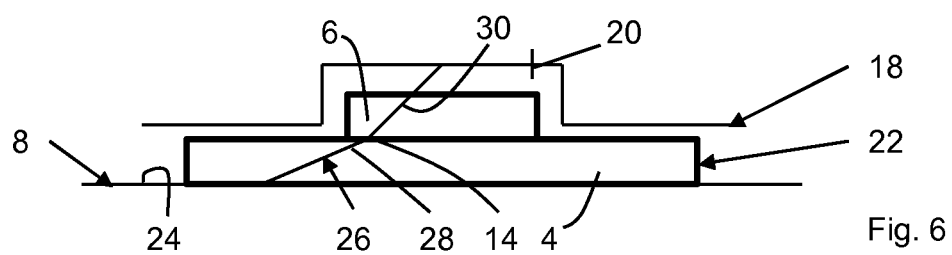

As soon as the resin is fed via the flow promoter 18 into the region of the ancillary laminate, or the local reinforcement layers 6, the resin distribution in the base laminate 6 remote from the flow promoter is further retarded, as shown in FIG. 6, so that the flow front 26 is, so to speak, subdivided into two sections 28, 30 that are separated from one another via a kink 14, wherein the section 28 on the side of the base laminate propagates more slowly than the section 30 on the side of the ancillary laminate, so that the flow front 26 extends through the component 22 with quite different velocities.

Figure 7:
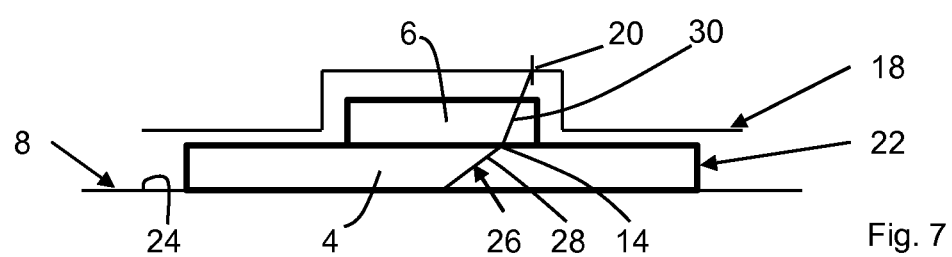

However, if the matrix material within the flow promoter 18 runs onto the body section 20 arranged in the rear region near a transition to the base laminate 4, as shown in FIG. 7, the propagation of the ancillary laminate-side section 30 is slowed down in the transverse direction, and by this means the impregnation of the component 22 in the thickness direction is improved, as a result of which the propagation velocity of the base laminate-side section 28 is increased.

Figure 1:
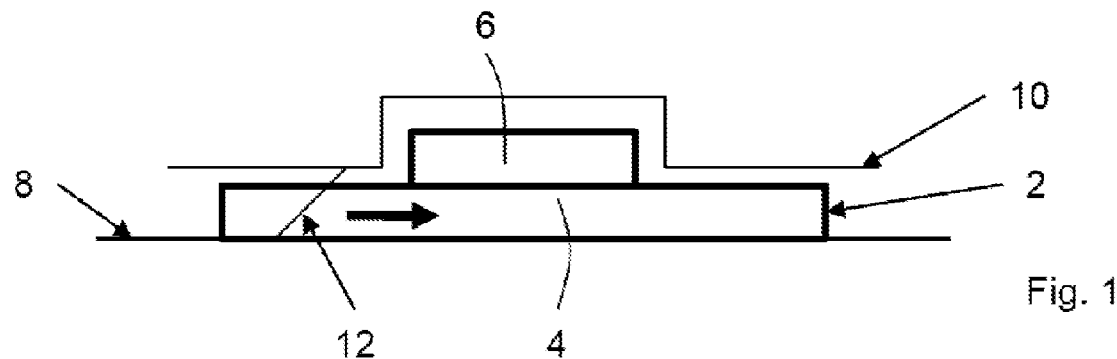
FIGS. 1 to 3 show a set-up and steps in the method for an infusion process of known art.
Figure 2:
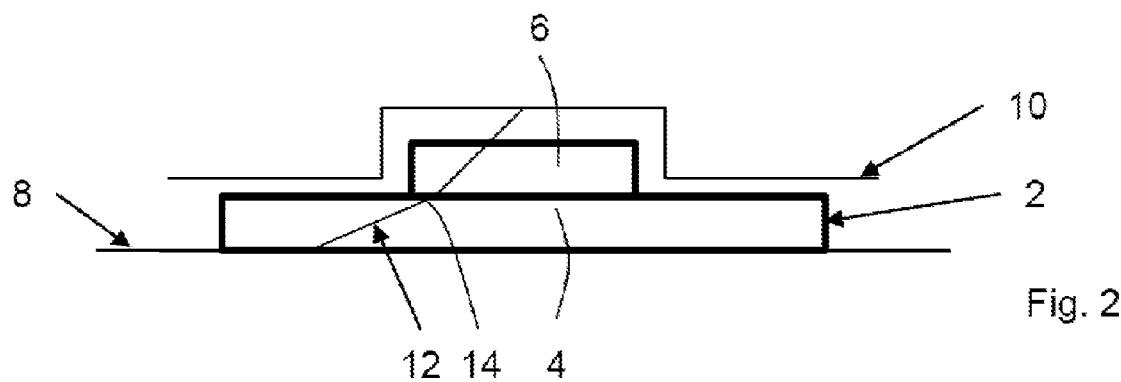
Figure 3:
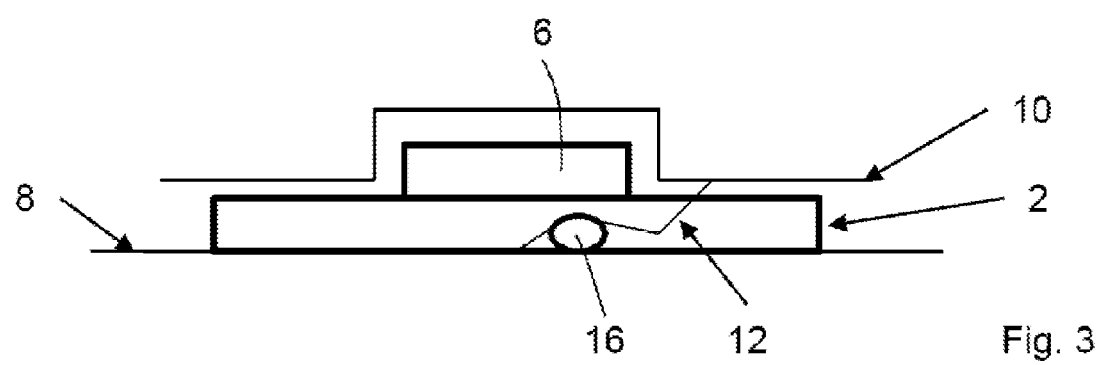
Figure 8:
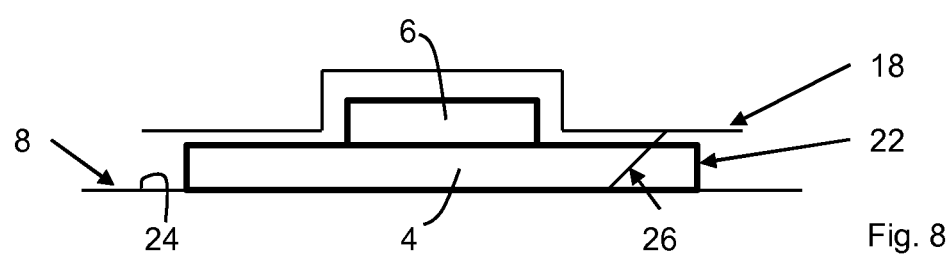

As soon as a sufficient harmonisation of the two flow front sections 28, 30 is achieved, for example by a flattening out, or an approximate flattening out, of the kink 14, the barrier 20 is automatically dissolved by the resin that has already been present for some time and halted in the transverse direction, in accordance with FIG. 8, so that a further distribution of the resin in the transverse direction of the component 22 through the base laminate 4 is possible, without the risk of porous areas (FIG. 3, 16) within the component 22. In this manner the component 22 is fully and evenly impregnated with the resin with the use of the inventive flow promoter 18.

Disclosed is an infusion method for the manufacture of a fibre-reinforced composite component with a flow promoter 18, wherein the flow velocity of the matrix material in a component 22 to be infiltrated is modified by means of the flow promoter 18; also disclosed is a flow promoter 18, which has an integral body section 20 for the modification of the flow velocity.

REFERENCE SYMBOL LIST

2 Component
4 Base laminate
6 Ancillary laminate
8 Tool
10 Flow promoter

12 Flow front
14 Kink
16 Porous area
18 Flow promoter
20 Body section
22 Component
24 Tool surface
26 Flow front
28 Section
30 Section

What is claimed is:

1. An infusion method for the manufacture of a fiber-reinforced composite, comprising:
    covering a fiber-reinforced component with a flow promoter and providing said flow promoter with a body section for modifying a flow velocity of a matrix material used to impregnate the component, the body section integral with the flow promoter and formed from threads of a dissolvable material;
    introducing the matrix material from an injection region;
    distributing the matrix material in a thickness direction across the component, wherein the flow velocity of the matrix material is modified in the thickness direction through the component in a rear region of a thick-walled component section opposite to the injection region; and
    dissolving the threads of the body section after a harmonization of different flow velocities through the component.

2. The infusion method in accordance with claim 1, further comprising slowing down the flow velocity in the rear region of the thick-walled component section opposite to the injection region.

3. The infusion method in accordance with claim 1, further comprising halting the matrix material temporarily in the flow promoter.

4. The infusion method in accordance with claim 1, wherein the body section is dissolved by the matrix material.

5. The infusion method in accordance with claim 1, wherein the body section is dissolved by irradiation.

6. The infusion method in accordance with claim 1, wherein the dissolution of the body section is initiated by irradiation and is then continued by the matrix material.

7. The infusion method in accordance with claim 1, wherein the body section is provided in a region of the flow promoter opposite to the injection region in the transverse direction.

\* \* \* \* \*